United States Patent [19]
Hicken

[11] Patent Number: 5,822,142
[45] Date of Patent: Oct. 13, 1998

[54] METHOD OF MAPPING LOGICAL SECTORS TO PHYSICAL SECTORS IN A DISK DRIVE SPARING PARTITION

[75] Inventor: Michael S. Hicken, Rochester, Minn.

[73] Assignee: Western Digital Corporation, Irvine, Calif.

[21] Appl. No.: 690,186

[22] Filed: Jul. 26, 1996

[51] Int. Cl.$^6$ ........................................... G11B 5/09
[52] U.S. Cl. ............................ 360/53; 371/21.6; 707/200; 711/202
[58] Field of Search ..................... 360/53, 77.08, 360/31, 48; 369/48, 54, 275.3; 371/10.2, 21.6; 395/823, 825, 182.03, 182.05; 711/4, 155, 201, 133, 202, 203; 707/200

[56] References Cited

U.S. PATENT DOCUMENTS

| | | | |
|---|---|---|---|
| 4,669,004 | 5/1987 | Moon et al. | 360/53 |
| 5,166,936 | 11/1992 | Ewert et al. | 371/21.6 |
| 5,271,018 | 12/1993 | Chan | 371/10.2 |
| 5,438,559 | 8/1995 | Best et al. | 369/54 |
| 5,500,848 | 3/1996 | Best et al. | 369/275.3 |
| 5,523,903 | 6/1996 | Hetzler et al. | 360/77.08 |
| 5,583,842 | 12/1996 | Wilson et al. | 360/48 X |

Primary Examiner—Aristotelis M. Psitos
Assistant Examiner—Patrick Wamsley
Attorney, Agent, or Firm—Leo J. Young, Esq.; Milad G. Shara, Esq.

[57] ABSTRACT

A disk drive includes a disk having a plurality of tracks. The disk is formatted so that the tracks are grouped into zones. Each of the tracks within a zone on a particular surface of the disk is written with the same data rate. The disk is formatted with sectors having no sector ID fields. The disk also includes groupings of tracks called sparing partitions. Sparing partitions generally contain less tracks than the number of tracks within a zone. A desired number of spare sectors are placed in each sparing partition and some of the spare sectors are used at manufacture while at least one of the spare sectors in sparing partition is reserved for future use. The disk also includes spare tracks and the disk drive has the capability of identifying bad tracks or defects in the servo areas of a track which make it difficult for the transducer to track follow. Bad tracks are skipped and a spare track is used. Tables, stored redundantly in a reserve area or reserve zone, store the location of all the bad sectors and tracks for converting logical block addresses to physical locations on the disk so that data or information can be found on the disk. The parameters of the zone in which the tables rare kept is optimized to insure that the tables can be read from the disk. The parameters of data zones can also be optimized to the performance capability of the individual head to disk interfaces.

2 Claims, 14 Drawing Sheets

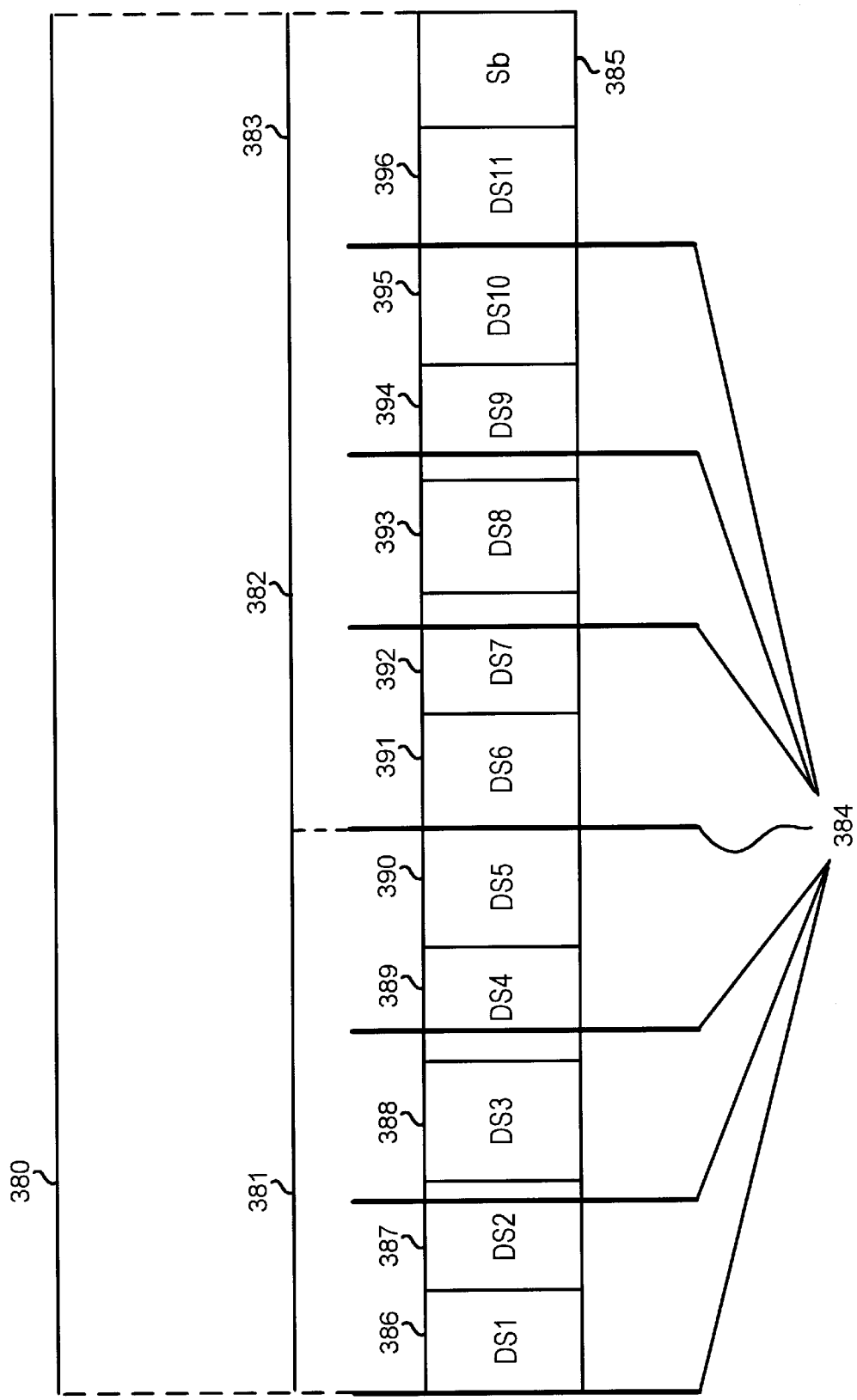

Fig. 4

| SPARING PARTITION | CYL | HEAD | PHYSICAL SECTOR NUMBER | | | | | | | | | |
|---|---|---|---|---|---|---|---|---|---|---|---|---|
| | | | 0 | 1 | 2 | 3 | 4 | 5 | 6 | 7 | 8 | 9 |
| 0 | 0 | 0 | 0 | 1 | 2 | 3 | 4 | 5 | 6 | 7 | 8 | 9 |
| | | 1 | 10 | 11 | 12 | 13 | 14 | 15 | 16 | S | S | S |
| 1 | 1 | 0 | 17 | 18 | 19 | 20 | 21 | 22 | 23 | 24 | 25 | 26 |
| | | 1 | 27 | 28 | 29 | 30 | 31 | 32 | 33 | S | S | S |
| 2 | 2 | 0 | 34 | 35 | 36 | 37 | 38 | 39 | 40 | 41 | 42 | 43 |
| | | 1 | 44 | 45 | 46 | 47 | 48 | 49 | 50 | S | S | S |
| 3 | 3 | 0 | 51 | 52 | 53 | 54 | 55 | 56 | 57 | 58 | 59 | 60 |
| | | 1 | 61 | 62 | 63 | 64 | 65 | 66 | 67 | S | S | S |
| 4 | 4 | 0 | 68 | 69 | 70 | 71 | 72 | 73 | 74 | 75 | 76 | 77 |
| | | 1 | 78 | 79 | 80 | 81 | 82 | 83 | 84 | S | S | S |
| 5 | 5 | 0 | 85 | 86 | 87 | 88 | 89 | 90 | 91 | 92 | 93 | 94 |
| | | 1 | 95 | 96 | 97 | 98 | 99 | 100 | 101 | S | S | S |

Fig. 5

| SPARING PARTITION | CYL | HEAD | PHYSICAL SECTOR NUMBER | | | | | | | | | |
|---|---|---|---|---|---|---|---|---|---|---|---|---|
| | | | 0 | 1 | 2 | 3 | 4 | 5 | 6 | 7 | 8 | 9 |
| 0 | 0 | 0 | 0 | 1 | 2 | 3 | 4 | 5 | 6 | 7 | 8 | 9 |
| | | 1 | 10 | 11 | 12 | 13 | 14 | 15 | 16 | S | D | S |
| 1 | 1 | 0 | 17 | 18 | 19 | D | D | 20 | 21 | 22 | 23 | 24 |
| | | 1 | 25 | 26 | 27 | 28 | 29 | 30 | 31 | 32 | S | D |
| 2 | 2 | 0 | D | 33 | 34 | 35 | 36 | 37 | 38 | 39 | 40 | 41 |
| | | 1 | 42 | 43 | 44 | 45 | 46 | 47 | D | D | 48 | S |
| 3 | 3 | 0 | 49 | 50 | 51 | 52 | 53 | 54 | 55 | 56 | 57 | 58 |
| | | 1 | 59 | 60 | 61 | 62 | 63 | 64 | 65 | 66 | D | S |
| 4 | 4 | 0 | 67 | 68 | 69 | 70 | 71 | 72 | 73 | 74 | 75 | 76 |
| | | 1 | 77 | 78 | 79 | 80 | 81 | 82 | 83 | 84 | D | S |
| 5 | 5 | 0 | 85 | 86 | 87 | 88 | 89 | 90 | 91 | 92 | 93 | 94 |
| | | 1 | 95 | 96 | 97 | 98 | 99 | 100 | 101 | S | S | S |

Fig. 7

PARTITION INDEX LIST

| PARTITION NUMBER (INDEX) | PD LIST INDEX | PARTITION PUSH COUNT |
|---|---|---|
| 0 | 0 | 0 |
| 1 | 1 | 0 |
| 2 | 4 | 1 |
| 3 | 7 | 2 |
| 4 | 8 | 1 |
| 5 | 9 | 0 |
| 6 | 9 | 0 |

Fig. 6

PD LIST

| INDEX | DEFECT (PHYS. BLOCK OFFSET) |
|---|---|
| 0 | 18 |
| 1 | 3 |
| 2 | 4 |
| 3 | 19 |
| 4 | 0 |
| 5 | 16 |
| 6 | 17 |
| 7 | 18 |
| 8 | 18 |
| 9 | |

Fig. 9

DEFECTIVE TRACK LIST

| INDEX | TRACK |
|---|---|
| 0 | 6 |
| 1 | 8 |

Fig. 8

| SPARING PARTITION | CYL | HEAD | PHYSICAL SECTOR NUMBER | | | | | | | | | |
|---|---|---|---|---|---|---|---|---|---|---|---|---|
| | | | 0 | 1 | 2 | 3 | 4 | 5 | 6 | 7 | 8 | 9 |
| 0 | 0 | 0 | 0 | 1 | 2 | 3 | 4 | 5 | 6 | 7 | 8 | 9 |
| | | 1 | 10 | 11 | 12 | 13 | 14 | 15 | 16 | S | D | S |
| 1 | 1 | 0 | 17 | 18 | 19 | D | 29 | 20 | 21 | 22 | 23 | 24 |
| | | 1 | 25 | 26 | 27 | 28 | 36 | 30 | 31 | 32 | S | D |
| 2 | 2 | 0 | D | 33 | 34 | 35 | 46 | 37 | 38 | 39 | 40 | 41 |
| | | 1 | 42 | 43 | 44 | 45 | X | 47 | D | D | 48 | S |
| 3 | 3 | 0 | 49 | X | 51 | 52 | 53 | 54 | 55 | 56 | 57 | 58 |
| | | 1 | X | X | X | X | X | X | X | X | X | X |
| | 4 | 0 | 59 | 60 | 61 | 62 | 63 | 64 | 65 | 66 | D | X |
| | | 1 | 67 | 68 | 69 | 70 | 71 | 72 | 73 | 74 | 75 | 76 |
| 4 | 5 | 0 | 77 | 78 | 79 | 80 | 81 | 82 | 83 | 84 | D | S |
| | | 1 | | | | | | | | | | |

Fig. 11

| PARAMETER | ZONE NUMBER | | | | | | | |
|---|---|---|---|---|---|---|---|---|
| | 0 | 1 | 2 | 3 | 4 | 5 | ... | n |
| */ NUMBER OF LOG CYLINDERS IN ZONE */ | | | | | | | | |
| */ SPARES PER PARTITION REGION */ | | | | | | | | |
| */ SPARES IN LAST PARTITION IN ZONE */ | | | | | | | | |
| */ NUMBER OF BYTES PER WEDGE */ | | | | | | | | |
| */ VALUE FOR THE START GAP */ | | | | | | | | |
| */ VALUE FOR THE MIDDLE GAP */ | | | | | | | | |
| */ VALUE FOR THE END GAP */ | | | | | | | | |
| */ BI-MODAL DELAY */ | | | | | | | | |
| */ NUMBER OF BYTES IN SERVO WEDGE */ | | | | | | | | |
| */ FIRST CYLINDER IN THIS ZONE */ | | | | | | | | |
| */ FIRST CYLINDER IN NEXT ZONE */ | | | | | | | | |
| */ END OFFSET INTO TRACK DEFECT LIST */ | | | | | | | | |
| */ START OFFSET INTO PART INDEX LIST */ | | | | | | | | |
| */ FIRST LBA IN NEXT ZONE */ | | | | | | | | |
| */ NUMBER OF SECTORS PER TRACK */ | | | | | | | | |
| */ NUMBER OF SECTORS PER PARTITION */ | | | | | | | | |
| */ OFFSET INTO SECTOR TO WEDGE TABLE */ | | | | | | | | |
| */ TRACK SKEW FOR FIRST TRACK IN ZONE */ | | | | | | | | |
| */ TRACK (CYL/HD) SKEW INC IN SECTORS */ | | | | | | | | |
| */ USER DATA RATE ON TRACK */ | | | | | | | | |

PARAMETERS

PHYSICAL ZONE

| HEAD | 0 | 1 | 2 | 3 | |
|---|---|---|---|---|---|
| 0 | 0 | 1 | 2 | 3 | |
| 1 | 1 | 2 | 3 | 4 | |
| 2 | | | | | |
| 3 | | | | | |
| 4 | | | | | | y

Fig. 14

METHOD OF MAPPING LOGICAL SECTORS TO PHYSICAL SECTORS IN A DISK DRIVE SPARING PARTITION

FIELD OF THE INVENTION

The present invention relates to the field of mass storage devices called disk drives. More particularly, this invention relates to a method and apparatus for formatting disks and managing defects within the disk drive.

BACKGROUND OF THE INVENTION

One of the key components of any computer system is a place to store data. Computer systems have many different places where data can be stored. One common place to store data in a computer system is on a disk drive. The term disk drive refers to a magnetic or hard disk drive which most personal computer users require every day to store data and to retrieve data from a C:\ drive.

The most basic parts of a disk drive include a disk that is rotated, an actuator that moves a transducer to various locations over the disk, and electrical circuitry that is used to write and read data to and from the disk. The disk drive also includes circuitry for encoding data so that data can be successfully retrieved and written to the disk surface. A microprocessor controls most of the operations of the disk drive as well as passing the data back to the requesting computer and taking data from a requesting computer for storing to the disk.

The transducer is typically housed within a small ceramic block. The small ceramic block is commonly known as a slider. The small ceramic block is passed over the disk in transducing relationship with the disk. The transducer can be used to read information representing data from the disk or write information representing data to the disk. A disk drive includes an actuator motor to move the transducers over the disk. A portion of the actuator motor is attached to one end of an actuator arm. The small ceramic block carrying the transducer is on the other end of the actuator arm. The actuator motor moves and repositions the ceramic block to different locations over the disk so that representations of data can be read from or written to the disk.

A constant pressure in the disk drive industry is to produce disk drives capable of storing additional amounts of data. Several drastic changes have been made over the past few years to advance the disk drives capability for storing additional amounts of data. Several of these changes relate to the formatting of the disk surfaces of the disk drive. In plain English, formatting of the disk really means the physical arrangement of customer data, servo information and other information on the surface of the disk.

Before discussing the advancements that emerged from changes in formatting the disk, it is necessary to discuss some of the basics relating to the storage of data on the surface of the disk. The surface of each disk looks like a disk of metal with a shiny, mirror finish. Some disks have small cross hatched scratches on the surface of the disk to enhance the disk's ability to be magnetized. Each of the surfaces of the disk is divided into a number of portions where information, such as data, is stored. There are a large number of tracks situated in concentric circles around the center of the disk, much like rings on a tree. Each track in a disk drive is further subdivided into a number of sectors which are essentially just short individual segments of one of the tracks on the disk drive surface. When writing data to the disk, the data is actually written into one or more particular sectors on a particular track. The actuator motor moves the actuator so that the slider and the transducer is positioned over the particular track. All data comes in a fixed size packet which is called a block, fixed in length, which corresponds to the size of the sectors on the tracks. Each sector is set up so that it holds exactly one fixed block. Of course it is critical that the transducer is precisely positioned before writing data or other information to the disk in a disk drive. If out of position, new data may very well erase data that the user wanted to keep. In the past, each sector included identification information called the sector ID field in front of each block of data. The sector ID field included a track number and a sector number that could be checked just before writing to confirm that the transducer was correctly positioned before reading or writing. Of course the problem with sector ID fields, or headers as they are commonly called, is that there are a very large number of sectors on a disk and a very large number of sector ID fields. Sector ID fields took up space that could otherwise be used to store data.

Over the years various schemes emerged to minimize the length of the sector IDs or headers. One of the largest advancements occurred when the industry eliminated sector IDs completely. The result is that the space previously devoted to Sector ID fields could now be used to store data. This increased the data capacity of disk drives by approximately 10–15%.

Another large formatting advance which increased the data capacity of a disk drive was zone bit recording or banding of the tracks on the disk. In the past, one single data rate was selected for the entire disk. In other words, when designing the disk drive and formatting it afterwards, the innermost track dictated the design and format. Individual magnetic transitions can be written in very close proximity to one another, however, the closer the transitions are written to one another, the higher the number of errors that occur. In the past, an acceptable error rate associated with a particular spacing between individual transitions, was selected for the innermost track. All the remaining portions on the disk had the same data density. In other words, if 20,000 individual transitions could be fit around the innermost track, 20,000 individual transitions were also recorded on the outer most track and all the tracks in between even though the length around the outermost track was much longer than the length around the innermost track.

A large advance was made when the industry learned how to record data to the same disk at different data densities. A portion of the disk drive electronics, called the data channel, that handled the data going to the disk and coming from the disk could not handle a continuously changing data rate from track to track, so several discrete data rates were selected. Individual tracks were grouped into bands or zones to which data could be written at a particular data rate with an acceptable error rate. As the disk drive moved from the inner innermost band to the outermost band, the data rates and channel rates get progressively higher.

In manufacturing a disk, various layers are placed on the disk and many times there are sections of the disk which will not function properly. For a magnetic disk, something may go slightly wrong with a magnetic layer and the end result is a small portion which cannot be magnetized. Portions of the disk which could not be magnetized are referred to as disk defects. Most of the time, the disk defects are small and affect one or two small portions of a track called a sector. Thus, disk defects are also sometimes referred to as bad sectors. Many times, spare sectors are provided on the disk. When a portion of the disk is bad, a spare sector is used in place of the bad sector or disk defect.

Before data is placed onto a disk, using a spare sector is relatively straightforward. Bad sections or sectors can also occur after the disk drive is used to store data. After manufacture when a bad sector develops, the bad sector is skipped and all the data in the sectors that follow on the disk drive are reassigned or "bumped" one sector position. This is a long iterative process. Each of the sectors following a bad sector are reassigned by reading each of the good sectors, storing the good sector in the reserve area of the disk, updating a check point sector, and then copying the good sector back to the data area into a new sector that is pushed down one logical sector location. This reassignment process maintains the original order of the data. This saves time on subsequent read operations since the data can still be read in a continuous stream rather than interrupting the stream of data to seek to a spare sector. Generally, the reassignment process is a lengthy, time consuming process as there may be many of thousands of sectors to rewrite before the first spare sector can be used.

There is a drastic need in disk drives to improve disk drive performance by reducing the amount of time needed to reallocate sectors after a bad sector or disk defect. There is also a need for a drive to have the capability to handle bad sections of the disk surface which are much larger than a sector, such as a track, especially in formatting schemes where no sector ID field is used. If reallocation of sectors and tracks can be done efficiently and effectively, the performance of a drive can be improved dramatically.

SUMMARY OF THE INVENTION

A disk drive includes a disk having a plurality of tracks. The disk is formatted so that the tracks are grouped into zones. Each of the tracks within a zone on a particular surface of the disk is written with the same data rate. The disk is formatted with sectors having no sector ID fields.

The disk also includes groupings of tracks called sparing partitions. Although not always true, a sparing partition generally contains less tracks than the number of tracks within a zone. A desired number of spare sectors are placed in each sparing partition. When the disk is formatted, bad sectors or disk defects are detected and some of the spare sectors are used within the sparing partition. A number of spare sectors are reserved within the sparing partition for grown defects which are defects that occur after manufacture of the disk drive. Even if there are more bad sectors in a sparing partition at the time of manufacture than there are spare sectors allocated to particular sparing partition, a number of the spare sectors are reserved or not used at the time of format and maintained in the sparing partition for later use when grown defects appear. This provides for dramatic improvements in performance of a disk drive. In the event of a grown defect, sectors have to be read, stored and rewritten to other sectors during a push-down reassignment of the sectors. When a spare sector is located within a sparing partition, the spare is physically located close to the defective or bad sector and the number of sectors which have to be read, stored and then rewritten to is reduced. Performance improves since it takes less time to do a reassignment.

The disk also includes spare tracks and has the capability of identifying bad tracks or defects in the servo areas of a track which make it difficult for the transducer to track follow. Performance is improved since less errors are produced by bad tracks. In many instances, errors due to lack of the ability to track follow take longer to correct since they may be longer than the errors that can be corrected on the fly by the hardware in the data channel and may require a reread. Rereads of tracks require that the head be passed over the same track again and again until the data can be read. In addition, it is much more difficult or nearly impossible to assure that the data read from a sector having no-ID is the requested sector when encountering track following difficulties. Without the servo field information regarding the track and the inability to track follow reliably, it is difficult to assure the correct data is being read or that the drive is writing to the desired track. The spare tracks and their detection at the time of formatting is critical in a no-ID disk drive to assure reliable performance of the drive since good tracks which provide the ability to track follow are the only tracks used.

Tables are kept in memory. The tables store the location of all the bad sectors and tracks for converting logical block addresses to physical locations on the disk so that data or information can be found on the disk. The tables are optimized to allow for quick conversions which also improves performance.

BRIEF DESCRIPTION OF THE DRAWINGS

FIG. 3b is schematic diagram illustrating a segment subdivision of a data recording track FIG. 4 is a schematic diagram of an example perfect disk without defects.

FIG. 5 is a schematic diagram of an example disk with defects in data sectors only.

FIG. 6 is a diagram of a push down defect index for the example disk with defects as shown in FIG. 5.

FIG. 7 is a diagram of a partition index list which includes a partition push count for the example disk with defects as shown in FIG. 5.

FIG. 8 is a schematic diagram of an example disk with defective tracks.

FIG. 9 is a diagram showing the defective track list.

FIG. 11 is a zone table showing the various zones and the parameters associated with each zone.

FIG. 14 is a table of zone data rates for each head and disk combination.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

I. General Description of a Disk Drive

Figure 1:
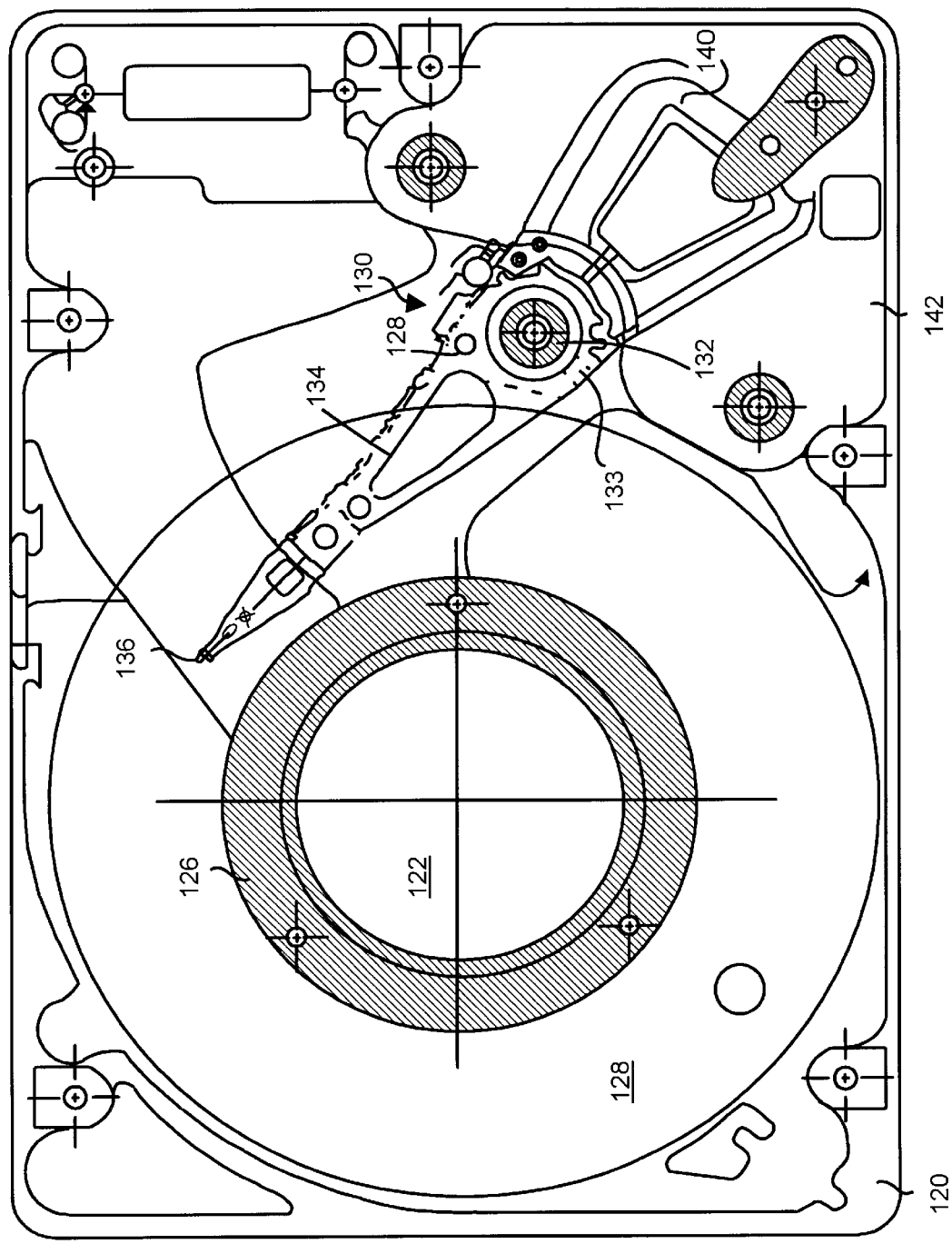
FIG. 1 is a top view of a disk drive having a rotary type actuator pivotally attached to the base of the disk drive.

Referring to FIG. 1, the principal electrical and mechanical components of a disk drive constructed in accordance with a preferred embodiment of the present invention are illustrated. The disk drive includes a head/disk assembly (HDA) 120 which includes a base 122 and a cover (not shown). Attached to the base 122 is a spindle with an attached hub 126. Attached to the spindle with an attached hub 126 is a disk 128. Also attached to the base is a spindle motor for rotating the spindle with an attached hub 126 and the disk 128. Spindle motor driver circuitry controls the current passing through the spindle motor to produce a torque and controllably rotate the hub and disk 128 attached to the spindle. An actuator assembly 130 is also attached to the base 122. The actuator assembly 130 shown is a rotary type actuator and is provided with a pivot apparatus 132, such as a bearing cartridge, to allow smooth rotation of the actuator assembly. The actuator assembly 130 includes a body 133 having arms 134 on one end. The arms 134 carry transducers 136 in transducing relation to the disk 128. A load beam or suspension 135 is attached to each arm. The transducers 136 are attached to each load beam or suspension 135. The transducers 36 are encapsulated within a slider or small ceramic block. The slider carries the transducer over the disk. The other end of the actuator body 133 includes a portion of an actuator motor. The portion of the actuator motor shown attached to the actuator body 133 is the coil 140. An other portion of the actuator motor is attached to the base 122. The other portion shown in FIG. 1 is a magnetic field apparatus 142. The coil 140 and the magnetic field apparatus 142 form a voice coil motor used to move the actuator body and reposition one or more sliders which carry the transducers 136, also commonly referred to as read/write heads, to different radial positions relative to one or more surfaces of the disk 128. The pivot apparatus 132, such as a precision bearing cartridge, allows for a smooth rotational movement of the actuator assembly 30.

II. Sector Architecture

Figure 2:
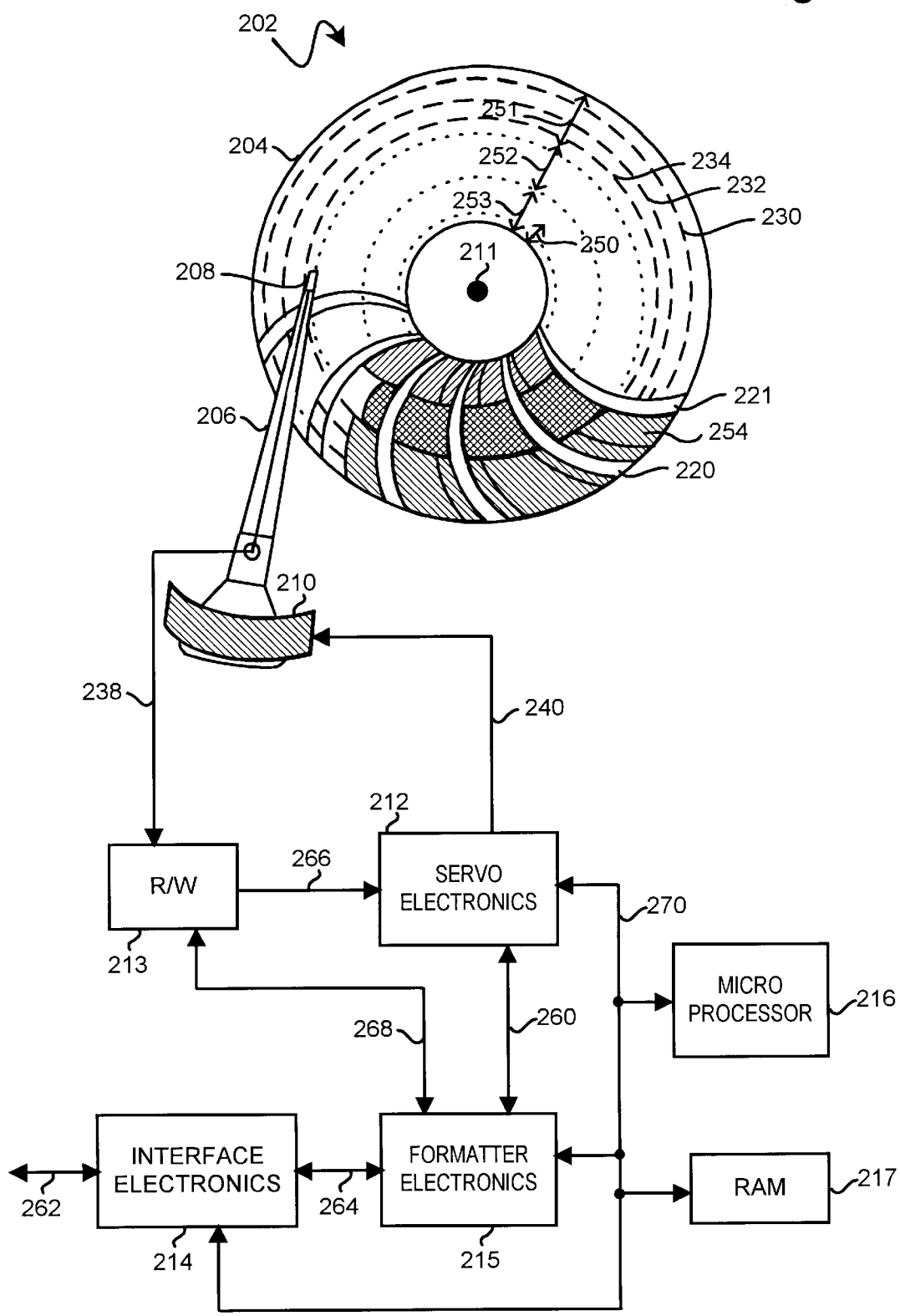
FIG. 2 is a schematic diagram illustrating a fixed block architecture and some of the electronics associated with the disk drive.

Shown in FIG. 2 is a disk drive formatted using a fixed block architecture with sector servo and zone-bit recording. The disk drive, designated generally as 202, includes data recording disk 204, actuator arm 206, data recording transducer 208 (also called a recording head), voice coil motor 210, servo electronics 212, read/write electronics 213, interface electronics 214, formatter electronics 215, microprocessor 216 and RAM 217. Data recording disk 204 includes center of rotation 211, and is divided for head positioning purposes into a set of radially spaced tracks, one of which is shown at 218. The tracks are grouped radially into a number of zones, four of which are shown as 250, 251, 252 and 253. Zone 250 is a reserve area zone where certain critical information such as tables and indices needed to convert logical block addresses to physical locations, are stored. The tracks are also grouped radially into a plurality of sparing partitions, three of which are shown as 230, 232, and 234. Each sparing partition includes a selected number of tracks and includes a number of desired spare sectors. As shown, the sparing partitions are groups of tracks which are smaller than the zones 251, 252 and 253 in which customer data is stored. It should be noted, that this does not necessarily have to be the case. The sparing partitions could be larger than the zones if so desired. The sparing partitions contain a selected number of spare sectors within each sparing partition. The sparing partitions are generally invisible and therefore the boundaries are shown as dashed lines. The disk contains a plurality of servo sectors 220, which extend across the tracks in a generally radial direction. Each track has a reference index 221. Within each zone, the tracks are also circumferentially divided into a number of data sectors 254. As will be discussed hereafter, the data sectors contain no sector ID fields. In accordance with the normal meaning of "fixed block architecture", all data sectors are substantially the same size, expressed in bytes of data. Different sector sizes may easily be adapted to tolerate some variation in data sector size, such as from 512 bytes per sector to 520 bytes per sector, in the event a customer desires or requires a different sector size. The number of data sectors per track varies from zone to zone, and some of the data sectors do not begin immediately following a servo sector. Further, some of the data sectors are split by servo sectors. If the disk drive has multiple heads, then the set of tracks which are at the same radius on all surfaces is referred to as a "cylinder".

Read/write electronics 213 receives signals from transducer 208, passes servo information to servo electronics 212, and passes data signals to formatter 215. Servo electronics 212 uses the servo information to produce a current at 240 which controls the voice coil motor 210 to properly position the transducer 208. Interface electronics 214 communicates with a host system (not shown) over interface 262, passing data and command information. Interface electronics 214 also communicates with formatter 215 over interface 264. Microprocessor 216 communicates with the various other electronics over command and data bus 270.

In the operation of disk drive 202, interface electronics 214 receives a request for reading or writing data sectors over interface 262. Formatter electronics 215 receives a list of requested data sectors from interface electronics 214 and converts them into zone, cylinder, head and data sector numbers which uniquely identify the location of the desired data sectors. The head and cylinder information are passed to servo electronics 212, which is responsible for positioning recording head 208 over the appropriate data sector on the appropriate cylinder. If the cylinder number provided to servo electronics 212 is not the same as the track number over which recording head 208 is presently positioned, a seek operation is performed to reposition recording head 208 over the appropriate cylinder.

Once servo electronics 212 has positioned recording head 208 over the appropriate track, servo electronics 212 begins executing sector computations in order to locate and identify the desired data sector. As servo sectors 220 pass under recording head 208, the index mark 221 identifies the first servo sector, a wedge number locates and uniquely identifies subsequent servo sectors. In the format used in the present invention, the field holding the wedge number at a first wedge contains a head number in the next servo sector. The head number and the wedge number are alternated. A count of wedge numbers/head number field can also be used to identify each servo sector. Additional information, which is described in greater detail below, is maintained in association with servo electronics 212 and formatter electronics 215 and is used to determine whether the present servo sector splits a data sector or whether a new data sector starts immediately following the present servo sector. Further information is maintained in servo electronics 212 and formatter electronics 215 which identifies the location of (or the distance to) the start of the next data sector from the present servo sector. Still further information is maintained which identifies the location of (or the distance to) any additional data sectors which begin before the next subsequent servo sector. Still further information identifies the number of the data sectors from the index mark 221. Other information determines the locations of the track and track offsets in the case of a bad or defective track. This information is used to allow formatter electronics 215 to compare the data sector number passing under the recording head with the list of sectors received from interface electronics 214.

This invention deals with improvements in formatting or arranging data, servo information and other information on the surface of a disk. As mentioned above, the disk surface includes a multiplicity of concentric tracks. In the following illustrations, the entire surface of the disk is shown in one illustration and then separate sections of track are shown to give further details with respect to the formatting. The sections of track illustrated below are very small portions of a track. To be absolutely correct illustrations, the small portions of the track should include a slight arc. However, since the arc is so slight, the illustrations of portions of the track are shown as long rectangular portions for ease of illustration.

Figure 3A:
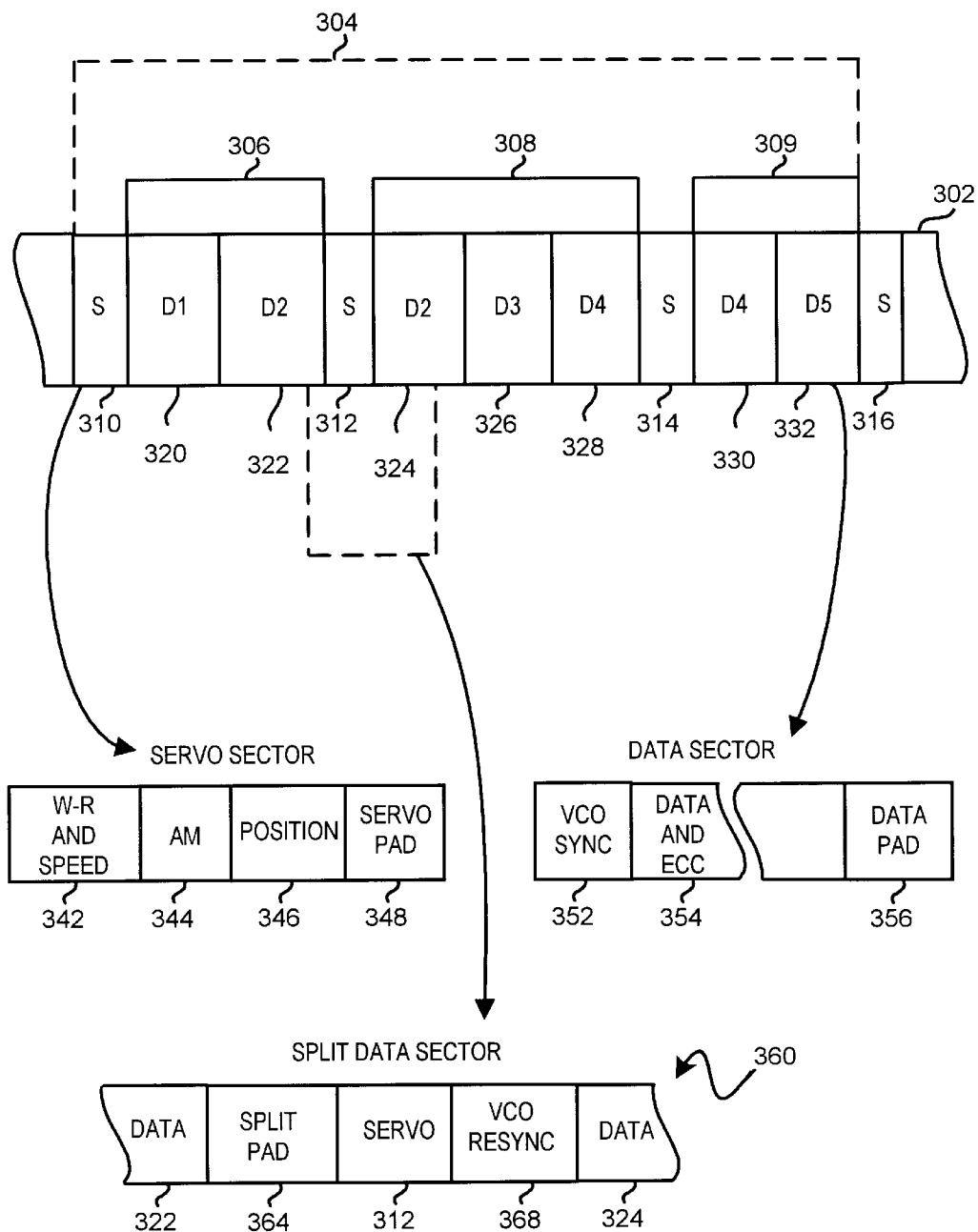
FIG. 3a is schematic diagram illustrating a segment subdivision of a data recording track.

Shown in FIG. 3a is a detailed schematic diagram of the sector architecture for an exemplary track from a data recording disk formatted as described above. A portion of a track is shown as 302, containing segment 304. Segment 304 is subdivided into a plurality of data regions, 306, 308 and 309. The data regions are separated from one another by servo sectors 310, 312, and 314. Segment 304 also includes a plurality of data sectors labeled D1 through D5. Finally, each data sector is made up of one or more data sections, labeled 320, 322, 324, 326, 328, 330 and 332. Logically, a segment is the set of servo sectors and data sectors having a unique spatial relationship between the sectors. The format for a track may then be produced by repeating the segment. A data region is the space between adjacent servo sectors. A data sector is the smallest individually addressable unit of user data, independently readable and writable. Finally, a data section is a contiguous portion of a data sector, not interrupted by a servo sector.

The exemplary track of FIG. 3a contains a number of data sectors and a number of servo sectors, not necessarily equal. Note that servo sector 316 is not part of the segment since data sector D5 ends just prior to servo sector 316. Each data region contains a number of data sectors, some of which may be split by servo sectors. For example, region 306 contains the entire data sector D1 (section 320), and only a portion of data sector D2 (section 322). Likewise, data sector D2 is split by servo sector 312 into sections 322 and 324.

Also shown in FIG. 3a are details of the contents of servo sector 310. Write-to-read recovery and speed compensation field 342 is used to allow the read/write electronics to switch from a data writing operation to a servo reading operation, and to allow for fluctuations in the disk rotational speed. Wedge number field 344 precisely identifies a specific position within the servo sector which is used as a timing reference. Position field 346 contains the actual servo information used to radially position the head, typically including a position error signal and other information such as a track number (track ID or TID), index value, servo sector number (or any portion thereof) and head number (or any portion thereof). Servo pad field 348 allows for the electronics to switch from reading servo to writing or reading data, as well as for disk rotational speed variations.

Also shown in FIG. 3a are details of the contents of data section 332, which contains a full data sector D5. VCO sync field 352 permits the read/write electronics to enable the voltage controlled oscillator (also known as a phase locked loop) to obtain proper phase lock for reading the data. Data and ECC field 354 contains the user data and error correction information. Data pad field 356 allows for differences in processing time for reading and writing data, as well as for flushing any encoder/decoder, and for disk rotational speed variations. It also provides sufficient time for the electronics to prepare for operating on the following servo or data sector.

Also shown in FIG. 3a is a detailed view of split data sector D2, labeled 360. Two additional fields are typically required when a data sector is split by a servo sector: split pad 364 and a VCO resync 368. Field 322 shows a portion of data sector D2 prior to servo sector 312. Split pad field 364 allows for the electronics to interrupt the reading or writing of data in a manner well known in the art. Servo sector 312 is followed by VCO resync field 368, which is used to restore the system to allow for continuation of the read or write operation. Finally, a portion of data section D2 following servo sector 312 is shown at 324. Note that split pad field 364 may be the same number of bytes in length as data pad field 356, or it may be different. Also, VCO resync field 368 may be identical in content to VCO sync field 352, but this is not required. More capacity may be achieved by making fields 364 and 368 shorter than their counterparts 352 and 356; methods for achieving this benefit are discussed in the prior art.

For any given data recording disk drive, there is a fixed number of servo sectors per track (hereinafter designated as N) throughout the disk. Also, for each zone there is a fixed number of data sectors on each track (hereinafter designated as M). If M is not a multiple of N, then some of the data sectors will be split by servo sectors. The split portions of each data sector are denoted as sections. Further, the first section belonging to a data sector is called the primary section and any remaining sections are called secondary sections. Since all data sectors on a track have the same number of bytes, and since the servo sectors are equally spaced, there will be a limited number of unique data sections on the disk drive.

It is to be noted that in accordance with the no-ID sector architecture, neither the servo sectors nor the data sectors include data ID fields. Instead, the information necessary to identify data sector numbers and data sector locations is provided in servo sectors 310, 312, 314, etc. and in electronic storage accessible to the servo electronics, as will be described in greater detail below.

It should be noted that the choice of the segment configuration is flexible. For example, the entire track could be defined as a segment. A space may be left at the end of a track, where the last data sector on the track ends substantially prior to the end of the track. Such a case is illustrated in FIG. 3b. The track is designated 380, and contains 7 servo sectors 384. There are 11 data sectors, DS1 through DS11. Note that data sector DS11 ends prior to the end of track 380. The remaining space is stub 385, which contains no user data since it is shorter than a data sector. This results in two full segments, 381 and 382, and one partial segment 383. The disk drive need only know the total number of data sectors on the track to handle the partial segment. Once the data sector number has reached the maximum value, the drive will wait until the next servo sector, which resets the data sector counter to the first data sector number. It is to be noted that a track format having multiple stubs may be selected, including stubs located within tracks as well as at their ends. In any event, an advantage may in some cases be achieved in the presence of stubs by redefining the region using a smaller segment size since this in turn decreases the amount of memory required to store the format information.

III. Defect Management Overview

Defects on the surfaces of the disk 128 of a disk drive 118 are inevitable. Manufacturing defects can arise due to variation in the thickness of the magnetic layer on the disk 128 and any number of other items. Defects can also arise after the manufacture of the disk drive 118 from head crashes, particles within the disk drive, corrosion on the surface of the disk, and other sources. Defects are not normally massive defects, but usually only affect small portions of the disk surface which usually translates to one to three sectors. When a defect is found within a sector, the sector is usually marked as a bad sector. When the defects occur in a data sector, such as 320, 322, 324, 326, 328, 330 or 332, the defect is located and a spare sector is used. When a defect occurs in a servo sector 310, 312, or 314, the entire track may be considered defective since it may make track following difficult.

Since defects or bad sectors and bad tracks occur in disk drives, a method and apparatus are described for handling the various defects and for accommodating these defects. Defects can be categorized into two general categories. Those defects that occur at manufacturing are generally termed manufacturing or production defects and are placed on a list of defects known as Plist defects. The defects that occur after manufacturing are termed grown defects and are placed on list of defects known as a Glist. For the sake of simplicity, in this application we will use the term Plist defects to refer to manufacturing defects and Glist defects to refer to grown defects. The Plist defects are generally dealt with "up front" at the time of manufacture. Glist defects require reassignment or reallocation of the data stored in sectors following the grown defect up until the next available spare.

Figure 10A:
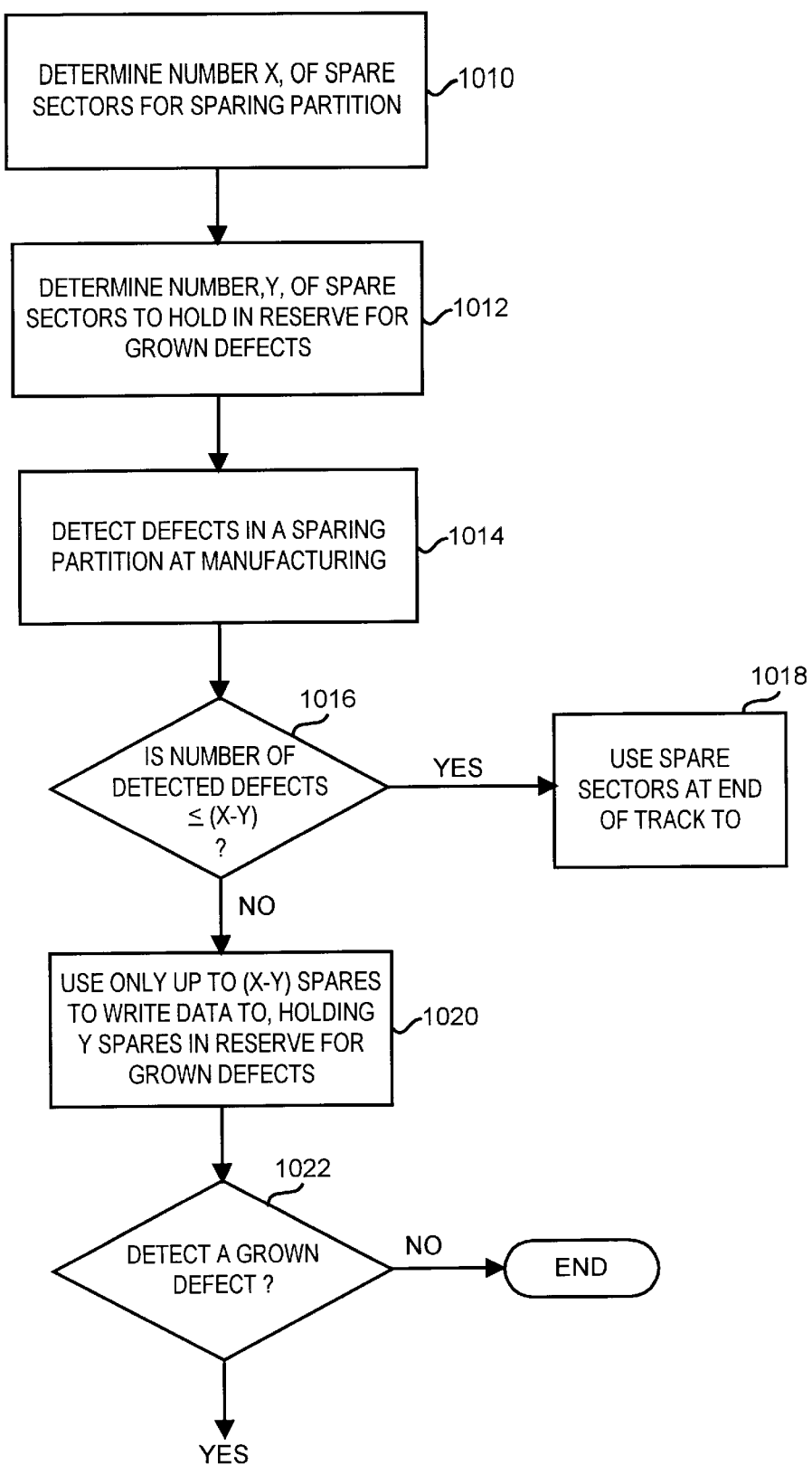
FIG. 10a is a first flow diagram detailing the defect management process.
Figure 10B:
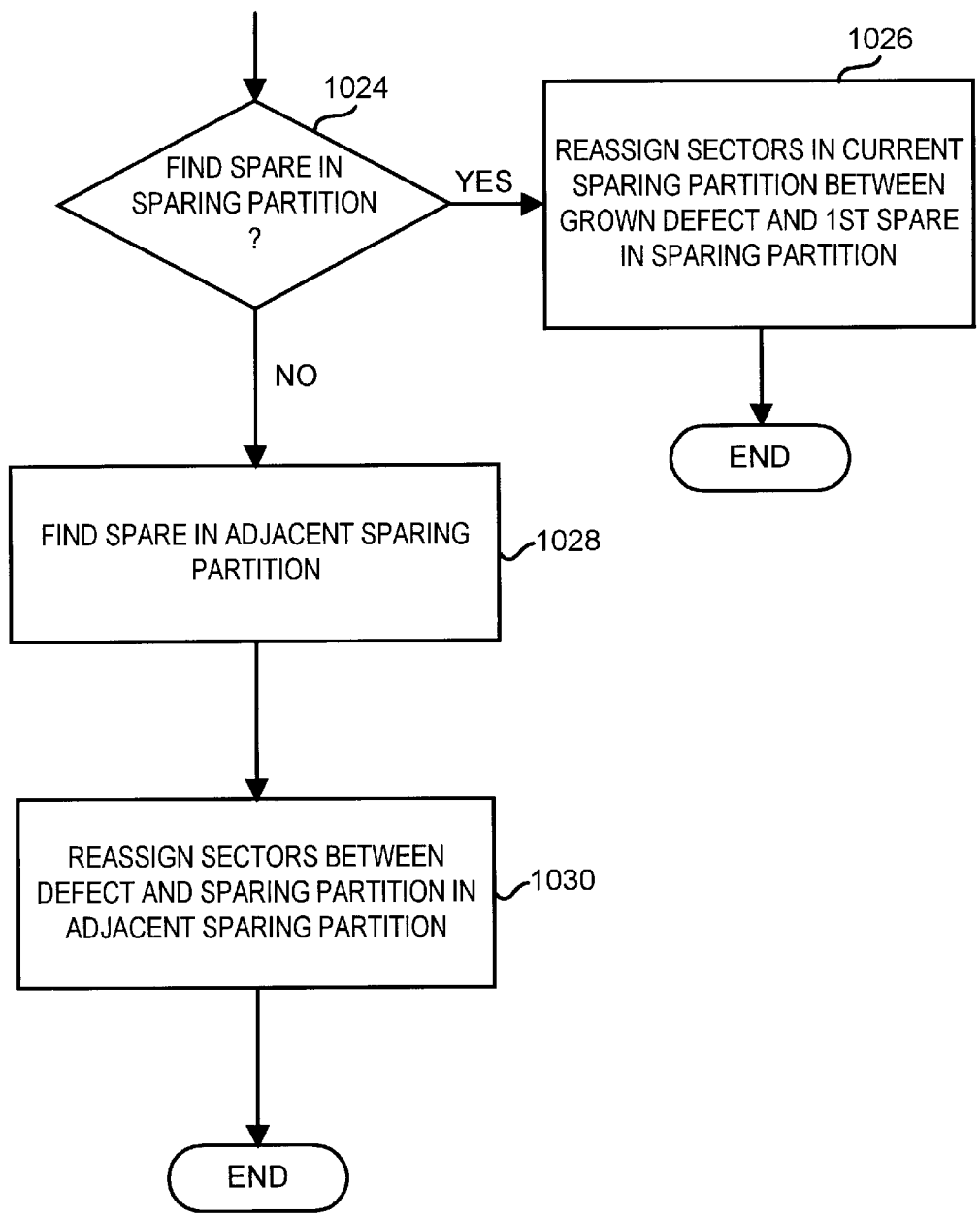
FIG. 10b is a second flow diagram detailing the defect management process.

A push-down or track slipping approach is used to manage the defects. This approach keeps the sectors in consecutive order and saves time on subsequent reads and writes. The approach used in this invention is shown in flow chart form in FIG. 10. A selected number, X, of spare sectors are placed within sparing partitions, as depicted by reference number 1010. Another selected number, Y, is the number of spare sectors to hold in reserve for grown or Glist defects, as is shown by step 1012. A certain number of the spare sectors within a sparing partition can be used for Plist defects. The rest of the spares must be reserved for Glist defects. Reserving a certain number of spares sectors for Glist defects improves performance of the drive when a grown or Glist defect is detected since the next spare will be at most the number of tracks placed into the sparing partition away from the defect. Thus, designers will know the approximate maximum length of time necessary to reallocate or reassign all the sectors within a sparing partition. Performance can also be enhanced if the sparing partition is selected so that the amount of memory necessary to hold all the sectors in a sparing partition corresponds with the capacity of RAM memory of the RAM 217 of the disk drive. If the sparing partition is small enough, data from the sectors to be reassigned can be stored in memory capable of being quickly accessed. Typically, the sectors to be reassigned will be written into the static RAM 217 and the data buffer of the disk drive. A copy will also be written to the reserve zone 250 or reserve area to provide a nonvolatile backup in the event of a power loss during the reassignment process. Any data still in the RAM 217 and the data buffer can be written directly back to the sector to which the data has been reassigned. If the data buffer and the RAM can hold all the data or information to be reassigned, then a read from the reserve zone will not be necessary. This saves time during the reassignment.

The next step in the push-down or track-slipping approach is to detect the defects that occur within a sparing partition. These defects are detected at manufacturing as is shown by reference numeral 1014. The next portion of the flow diagram is decision box 1016 which asks whether the number of detected defects is less than the quantity (x–y). X is the total number of spares for a sparing partition and y is the number of spares to be held in reserve for grown defects. Thus, the quantity (x–y) is the number of defects which can be corrected with spares within the sparing partition. If the number of detected defects is less than or equal to (x–y), then the spare sectors at the end of the track can be used for reassignment as shown in block 1018. If the answer is no, then only up to (x–y) spares are used. This leaves y spares in reserve for grown defects as depicted by box 1020 of the flow diagram in FIG. 10a. The next step in the flow diagram is whether a grown defect is detected as shown by decision box 1022. If no grown defect is found, nothing needs to be done. If a grown defect is found, then the flow diagram goes to another decision box 1024. In decision box 1024, the decision relates to whether spares are found within the sparing partition. If spares are found, the sectors can be reassigned within the current sparing partition between the grown defect and the first spare in the sparing partition as is shown by box 1026. If spares are not found in the sparing partition, in other words, if the spares within the sparing partition have been previously used, then spares must be found in adjacent sparing partitions as shown in box 1028. It should be noted that the adjacent sparing partition might not be the contiguous sparing partition, it may be within a range of sparing partitions. Once a spare is found within an adjacent sparing partition, the sectors between the defect and the sparing partition and the adjacent sparing partition are reassigned and the spare is used as depicted by the box 1030 in FIG. 10b.

Tables and indices are created from the Plist and the Glist. Both must be kept to assure that the defects, whether manufacturing or grown, can be found for future accesses. The Plist and Glist are necessary to build and update the tables and indices discussed below.

IV. Building Tables for Defect Handling

More specifically, at format or manufacturing time, the data recording disk file generates a list of physical sector location identifiers for the bad sectors in the disk file called the Plist. The Plist may be generated using any of the various techniques known in the art for locating bad sectors. The Plist is held in RAM during the operation of the drive and is used to construct various look-up tables which will be discussed later in this application.

To aid in illustrating some of the concepts of the of the defect management scheme of this invention, an example will be discussed. The example assumes a fictitious drive with very simple parameters. The parameters do not reflect those of an actual drive. The parameters assumed are a disk drive having one disk having two recording surfaces, 10 sectors per track, 2 heads per cylinder, 2 tracks per sparing partition, 3 spare sectors allocated to each sparing partition (spares for both Plist and Glist defects), and 17 logical block addresses or logical customer data sectors per sparing partition. One of the 3 spare sectors per sparing partition must be reserved for use with grown or Glist defects. One item worthy of note is that the sparing partition size is not necessarily tied to the number of tracks in the cylinder.

FIG. 4 shows an example diagram of a perfect disk without defects. FIGS. 4–6 show only data sectors since servo sectors are not be reassigned under a defect management scheme. Across the top of the diagram the Physical Sector Number can be found. Along the left hand side of the diagram, the physical or actual cylinder number and the physical or actual head number are found. It should be noted, that tracks at equal radii from the center of rotation of the disk have been referred to as being within the same cylinder since the tracks are conceptually on the surface of a cylinder at the same radius. Also, in a disk drive there is generally one head per disk surface. Thus, the head can be used to indicate a particular surface of the disk. Given a reference such as the reference index 221 on the disk and the actual cylinder, the actual head, and the physical or actual sector number with respect to the same reference index 221, the drive can determine the actual location of data on the disk. The sparing partitions, which are a selected number of tracks containing a selected number of spares, are also represented along the left hand side of the diagram.

The logical block addresses or logical sector numbers are the sector numbers of the consecutively numbered good sectors. The logical block addresses or logical sector numbers are the non-bold numbers entered in individual cells of the table in the diagram of FIG. 4. As can be seen, good sectors include a logical block address or logical sector number. Each sparing partition has 3 spares located at the end of each of the sparing partitions. The spare sectors are denoted by an "S" in a shaded cell or box. For example, the actual position of the first spare is in cylinder 0, head 1, at physical sector location 7.

FIGS. 5–7 will now be discussed. FIGS. 6 and 7 are indices which depend on FIG. 5. FIGS. 6 and 7 are also built from FIG. 5 so a clear explanation of FIG. 6 and 7 can be made if discussed along with the defects as they are found in each of the sparing partitions found in FIG. 5.

FIG. 5 shows an example diagram of a disk with defects only occurring in the data sectors on the disk. In other words, FIG. 5 does not have any defective tracks which result from defects occurring in the servo sectors on a track. Defects are depicted as shaded blocks which contain a "D". A first defect occurs at the actual position of cylinder 0, head 1, actual physical sector number 8. It should be noted that this defect is in the 19th sector from the beginning of the sparing partition 0. The sector count includes a sector 0, so the 19th actual physical sector has an reference number 18. It should also be noted that there are 17 good sectors in sparing partition 0, and that there is at least one spare at the end of the sparing partition 0 for use if a grown or Glist defect occurs.

FIG. 6 is a push down defect list or PD list. The PD list contains a sequential list of all the defective sectors that are coded in a pseudo physical block format. Each entry contains the physical block offset from the start of the sparing partition to the defective sector. The order of the defects stored in the PD list matches the logical order that sectors are accessed and defects are encountered in a logical mode. The PD list is primarily optimized for minimum size and for fast conversion from a logical block address (LBA) to a physical address (cylinder/head/sector). Now looking at FIG. 6, the PD list is comprised of two columns. In the first column is an index which is merely the number of the defect. In the second column is the defect physical block offset which is the number associated with the actual physical sector position in a disk drive. As noted above in the previous paragraph, the defect occurs in the actual physical sector which would be numbered 18 from the beginning of partition 0. As can be seen, the first defect with an index number 0 occurs at the sector having identifying number 18 in sparing partition 0. The PD list is actually a numbering of the defects as they occur and also an index to the location of the defect.

FIG. 7 is a partition index list. The partition index list contains an entry for each sparing partition on the drive. Each entry contains two fields. The first field, shown as a column in FIG. 7, contains a partial listing of the index from the PD list. The index is a numbering of the defects as they occur on the disk. The PD list index used in the partition index list includes the index number from the PD list of FIG. 6 that corresponds to the first defect after the start of a sparing partition. The second field, also shown as a column, is the partition push count. The partition push count is a count of the number of sectors that have been pushed onto this partition from their ideal location in the previous partition. In other words, each sparing partition in this example should include 17 good sectors. In some instances, more defects may occur in a particular sparing partition so that a particular sparing partition may "get behind" in terms of the number of good sectors it has and will have to push down several sectors onto the next sparing partition. FIG. 5 shows 17 good sectors in sparing partition 0. Since there is no partition pushing sectors into this sparing partition, the partition push count for the partition number 0 is 0.

In sparing partition 1 of FIG. 5, there are three defects shown by shaded blocks with a D therein. On the PDlist of FIG. 6, the defect number 1 is at position number 3 from the beginning of the sparing partition. The second defect in the sparing partition 1, having an index number of 2, is at the fourth position from the beginning of the index. Finally, the third defect, having an index number 3, is in the nineteenth position from the beginning of sparing partition 1. These are reflected on the PDlist of FIG. 6. Also with respect to FIG. 7, the partition number 1 has the first defect referenced 1 as its first defect. Therefore, in FIG. 7 for sparing partition number 1, the PDlist index is also 1 and the partition push count is 0 since no sector was pushed down form sparing partion 0 into this particular sparing partition. It is worthy of note that partition 1 has only 16 good sectors located therein and that there is one additional spare reserved, designated by a shaded cell with an S therein, for use for grown defects.

Now turning back once again to FIG. 5 and looking at the sparing partition numbered 2, this sparing partition also has three defects and a spare has been reserved in sparing partition number 2 as well. The defects are identified by index numbers 4, 5 and 6 in sparing partition 2. FIG. 6 shows that defect number 4 occurs in the 0 position with respect to the beginning of sparing partition 2; and that defect 5 occurs in the position numbered 16 from the beginning of sparing partition 2; and defect number 6 refers to the defect that occurs in position number 17 form the beginning of sparing partition 2. Now looking at FIG. 7, the entry for partition number 2 will be explained. In partition number 2, the first defect that occurs is defect number 4. The partition push count is 1 since partition number 1 only holds 16 good sectors and should hold 17. The result of this is that one good sector has to be pushed down from sparing partition 1 to sparing partition 2. It should be noted that since three defects occurred in sparing partition number 2, there are only 16 good sectors in sparing partition number 2, so an additional good sector will have to be pushed down onto sparing partition number 3.

Sparing partition number 3 only includes one defect which is the defect with the reference number 7. Sparing partition index number 3 also has a partition push count of 2, since the last two partitions only held 16 good sectors apiece, rather than the 17 they each should have held. There are now two spare partitions pushed down to sparing partition number 3. In other words, at the beginning of sparing partition number 3, it can be thought of that the logical block address for the spare sectors is approximately 2 behind the logical block address that would occur on the perfect disk as shown in FIG. 4. Turning to the PD list of FIG. 6, sparing partition number 3 includes the defect having the index number 7 and it occurs at the position 18 after the sparing partition.

Now looking at sparing partition 4 of FIG. 5, it includes one defect as well as one spare. The defect is number 8 which occurs at the position 18 after the beginning of the sparing partition as shown by the PD list of FIG. 6. Now turning to FIG. 7, the entry for sparing partition number 4 will be explained. Sparing partition number 4 has as its first defect or bad sector as the one with an index number of 8. In addition, the previous sparing partition number 3 held 18 good sectors and, therefore, the partition push count is at 1. In other words in terms of numbering logical block addresses or good spares in the particular sparing partitions at the beginning of sparing partition number 4, it is only one behind the ideal number at which it should begin. It should be noted that sparing partition number 4 also holds 18 good spares and, therefore, at the beginning of sparing partition number 5, the logical block address should not be behind, but should be equal to the ideal logical block address. This is in fact true since the logical block address at the beginning of the sparing partition number 5 in FIG. 5 is 85 and it is the same as on the perfect disk shown in FIG. 4. Since there is no defect in sparing partition number 5, there is no entry on FIG. 6 for the index number numbered defect 9. In FIG. 7 for sparing partition number 5, the PD list index is for defect number 9 which has not yet occurred. In addition, the partition push count is 0 since there are no additional good sectors that are being pushed down from sparing partitions above.

The above example shows how the partition index list of FIG. 7 and the PD list of FIG. 6 are formed or built. In summary, the PD list is an index of all of the defects. In the left-hand column is just merely a numbering of the defects and in the right-hand column is a physical block offset from the beginning of the sparing partition at which the particular defect occurs. The partition index list of FIG. 7 has a partition number index in the first column. The second column includes the PD list index which is the first defect to occur within the particular sparing partition and the third column includes a partition push count which is a count of the number of sectors that have been pushed onto this partition from their ideal location on a previous partition.

FIG. 8 shows a table which is similar to those shown in FIGS. 4 and 5, but which now includes defective tracks. This will be discussed in conjunction with FIG. 9 which shows a defective track list. By discussing FIGS. 8 and 9 together, the relationship between the actual positions of physical tracks which are found defective and the defective track list can be more clearly shown. It should be noted that FIG. 8 is an extension of FIG. 5 and illustrates what happens when defective tracks are found in a disk drive. With respect to defects and their locations, they are positioned at exactly the same spot in FIG. 5 as in FIG. 6 but for the defective tracks. The PDlist of FIG. 6 and the partition index list of FIG. 7 remain accurate with respect to FIG. 8. In operation, the table of defective tracks is also independent of the other tables. Thus, FIGS. 4, 5 and 8 can be thought of as introducing progressively different kinds of defects so that the reader can understand how the various indices shown in FIGS. 6, 7 and 9 are built. The defective track list contains an entry for each defective track on the disk drive. Each entry contains a physical track offset or the number of tracks from the start of a zone to the defective track. Entries are stored in ascending order for each consecutive zone. FIG. 8 presumes that cylinder 0 and partition 0 are at the beginning of a zone. The first defective track with an index number 0 is in track position number 6. It should be noted that the track positions of FIG. 9 assume a 0th track, so the track in FIG. 8 associated with cylinder 0 and head 0 is track 0. The track associated with cylinder 0, head 1 is track 1. On cylinder 1, there are two more tracks which would be numbered 2 and 3, and on cylinder 2, there are another two tracks which would be numbered 4 and 5. Therefore, the track associated with cylinder 3, track 0 is position number 6 from the beginning of the zone.

The next defect has an index number of 1 and the position from the beginning of the zone is track number 8. The defective track index numbers are given out consecutively and the track is actually an offset from the beginning of the zone, so the defective track list shown in FIG. 9 would have increasing track numbers as long as defective tracks occur within a zone. When a zone boundary is crossed, the defective track index numbers continue to ascend while the track numbers would start at a low value and ascend again as defective tracks were found within the particular zone. It should be noted when looking at FIG. 8 that the partition still includes two tracks even in the presence of a defective track which is depicted by a set of shaded cells having x's therein. For example, sparing partition number 3 has two tracks which have good sectors therein. The tracks in sparing partition number 3 are the tracks associated with cylinder number 3, head number 1 and cylinder number 4, head 1. Sparing partition number 4 also has two good tracks from cylinder number 5. FIG. 8 shows a defective track example and FIG. 9 is built from the example. FIGS. 8 and 9 show the relationship between the defective track list and an actual example. It should be noted that the PDlist of FIG. 6, the partition index list of FIG. 7 and the defective track list of FIG. 9 are made from both the Plist of manufacturing defects and the Glist of grown defects. By looking at both the Plist and the Glist, the indices and lists shown in FIGS. 6, 7 and 9 can be created.

In addition to the PDlist of FIG. 6, the partial index list of FIG. 7 and the defective track list of FIG. 9, another table necessary for defect management is a zone table as shown in FIG. 11. The zone table includes a number of parameters in the first column. In subsequent columns are the zone numbers as well as the values associated with the various parameters for the zone number. In essence, FIG. 11 is a matrix of the zone numbers and the values of the various parameters listed. The first nine parameters listed in zone table 1100 are parameters that are fixed at the time of design. The remaining parameters listed are those parameters which may be modified by the firmware during a format operation and will vary based on the number of defective tracks.

V. Hardware Overview for Locating and Identifying Data Sectors

The components required for sector computation in accordance with the present invention are shown in FIG. 2. In general, the microprocessor 216 and the random access memory 217 (also known as a RAM) which can access a set of registers are the components used to convert logical block addresses to actual physical locations on a disk. The set of registers is connected to the address and data bus 270. The set or registers may reside within servo electronics 212, in format table 422 or within the random access memory 217. Microprocessor 216 (or other electronics) stores information in the random access memory and in the registers, and then accesses this information in order to perform sector identification and location computations. Firmware is used to do the location computations or conversions from logical block addresses to physical zone, cylinder, surface and sector location.

In particular, RAM 217 stores the information required to determine the location of the data within the disk drives. For convenience of description the information required to determine location is shown organized into a set of tables and indices, similar to those shown in FIGS. 6, 7, 9, 11, although any appropriate data structure may be substituted. The creation of the tables and indices were discussed earlier in this specification. The tables are created from both the Plist and the Glist of defects. The tables as created at manufacturing are updated as grown defects are found and reassignments are made.

VI. Logical to Physical Sector Conversion

In operation, a read or write command is issued. The read command is translated into a request for a specific sector or sectors which start at a logical block address. The logical block address is converted to a physical location on the disk surface using a series of tables and indices. Firmware, or software that controls hardware, uses the tables and indices to convert logical block addresses to physical locations and to double check the locations after conversion. In this invention the tables and indices shown in FIGS. 6,7,9 and 11 are used to perform the logical to physical sector conversions.

Figure 12:
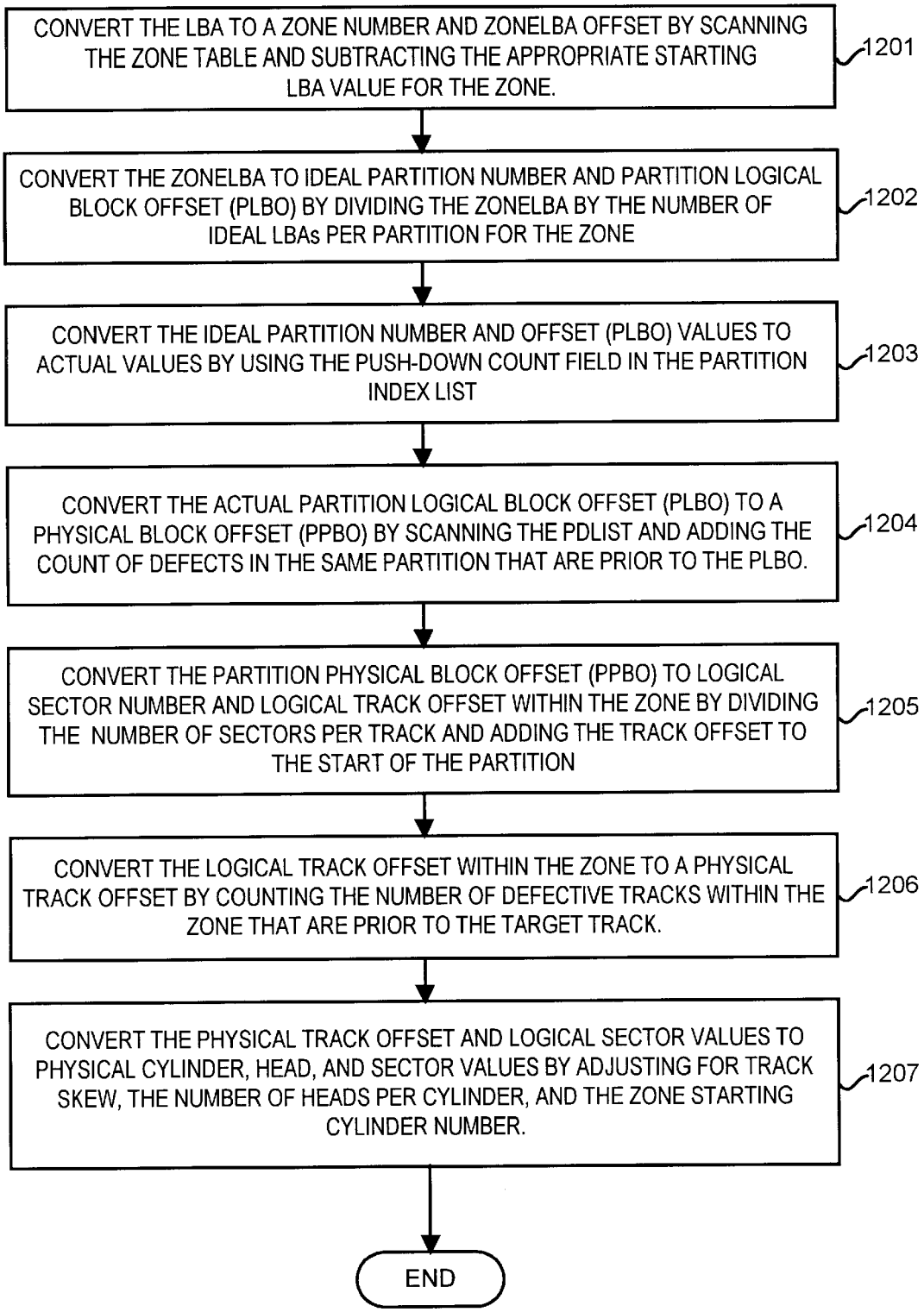
FIG. 12 is a flow diagram detailing the process of converting from a logical block address to a physical location on the disk.

FIG. 12 shows a flowchart of the conversion of logical block addresses to physical locations on the disk using the PDList of FIG. 6, the Partition Index List of FIG. 7, the Defective Track List of FIG. 9, and parts of the Zone Table of FIG. 11 to convert logical block addresses to physical locations on the disk.

The microprocessor 216 uses these lists and firmware in order to perform conversions from logical block addresses to physical locations on the disk. The first step, depicted by step 1201 in FIG. 12, is to convert the logical block address (LBA) to a zone number and zone LBA offset. This is done by looking at the zone table and subtracting the appropriate starting logical block address value for a particular zone. Note that one of the parameters in the zone table shown in FIG. 11 is the first LBA in the next zone. The zone LBA is the number of good sectors which must be counted from the beginning of the zone to find the logical block address or LBA given. The next step is to convert the zone LBA to an ideal partition number and partition logical block offset as depicted by step 1202 in FIG. 12. The ideal partition is found by dividing the zone LBA by the LBAs per partition in coming up with the quotient. The ideal partition logical block offset (PLBO) is determined from the remainder of the division of the zone LBA divided by the LBAs per partition.

The next step depicted by reference numeral 1203 is to convert the ideal partition number and ideal PLBO values to actual values by using the push-down count field in the partition index list from FIG. 7. If the ideal PLBO plus a partition index list push count for an ideal partition is less than the LBAs per partition, then the partition equals the ideal partition and the PLBO equals the ideal PLBO plus the push count. If the above is not true, then the partition equals the ideal partition plus 1 and the PLBO equals the ideal PLBO plus the partition index push count for the partition minus the LBAs per partition.

The next step is to convert the actual logical block offset to a physical block offset by scanning the PD list found in FIG. 6 and adding the counted defects in the same partition that are prior to the partition logical block offset (PLBO). This step is basically adding the number of sectors that are physically skipped sectors so that the physical block offset can be found. The next step numbered 1205 is to convert the partition physical block offset (PPBO) to a logical sector and logical track offset within the zone by dividing the number of sectors per track and adding the track offset to the start of the partition. The computation done in this step 1205 is to calculate a logical track location. In step 1206, the logical track offset is converted within the zone to a physical track offset by counting the number of defective tracks within the zone that are prior to the target track. In other words, this particular step includes the tracks that are skipped to arrive at an actual physical track.

Once the physical track is located, the next step 1207 is to convert the physical track offset and logical sector values to physical cylinder head and sector values by adjusting for track skew, the number of heads per cylinder and the zone starting cylinder number. The physical sector equals the logical sector plus the skew equation. The skew is a number which allows for distance along the circumference of a track and allows for a track access between adjacent tracks so that the disk drive does not have to go through a total rotation to find the first logical block address of the next or adjacent track.

To perform a reassignment, the firmware must locate a spare sector to be used. This corresponds to step 1028 in FIG. 10b. Prior to performing the reassignment, the firmware must locate the spare sector to be used. The number of blocks that must be pushed down one location must also be calculated. The first step is to determine the actual physical location by converting the logical block address given to an actual physical location. Then the number of unused spares for the particular sparing partition is calculated using the values of the push count from the partition index list of FIG. 7 and the number of spares per partition which is found in the zone table shown in FIG. 11. Starting with the ideal number of spares per partition, the partition push count for the particular position is subtracted from the spares per partition. The push count for the particular partition is the number of spares or number of ideal or good sectors that have been pushed onto the partition. The push count for the next partition from the partition index list is then scanned from zone table 1100. The number of good sectors pushed off the other end of the partitions determined. By adding the number of good sectors pushed off the other end, the number of good partitions can be determined within the sparing partition. The next step is to look at the defect count at the beginning of the next partition and subtract the PDlist index for the partition in which the physical block is located. This determines the number of unused spares that are found in the partition. If the unused spares is greater than or equal to 0, then the reassignment can occur within the partition. If there are no spares available, then nearby sparing partitions have to be searched for unused spares, repeating the steps listed above.

VII. Storing Look-up Tables

According to the present invention in which the ID region has been eliminated, bad sectors and bad tracks are identified and mapped out of the data recording disk file during logical-to-physical sector conversion using a series of look-up tables. The tables are created at the time when the disk is formatted and when manufacturing defects resulting in bad sectors or tracks can be found. The tables are also updated when additional defects occur after manufacture. The additional defects occurring after manufacture are known as grown defects. The tables include entries describing clusters of bad sectors (where a cluster is defined as a sequential group of sectors exhibiting a disk defect) by starting location and quantity. The tables also identify the location of bad tracks. Bad tracks typically are not characterized by disk defects in the data sectors. Rather, bad tracks occur more typically when disk defects occur in servo sectors. Servo sectors include quad bursts used to create position error signals (PES) used to fine tune the radial position of the actuator and transducer. When several of the servo sectors around one track include defects, it becomes difficult to produce an accurate PES and, in turn, it is difficult to control the actuator and transducer so that it follows along the track. Rather than have a wandering transducer which cannot track follow, the track is marked as bad or defective.

The various look-up tables or data representing the various look-up tables are critical to the operation of the disk drive. These tables are stored in a separate zone 250 or a reserve zone on the disk drive. Since it is critical that this information is retrievable, the tables are stored at various locations within the reference zone 250. One set of tables is stored below each head of the disk drive and in the same zone. When the disk drive initially begins its operations, a first head reads the information represented by the look-up tables. If the information is deemed not to contain errors, then the operation stops. If the first head yields information that contains errors, then the redundant information written below the second head is read. The process continues until one of the heads of the disk drive reads the information represented by the series of look up tables and indices correctly. Once the information is error free or read and corrected, the process of going to the next head within the zone is ended. The information representing the tables and indices are read into RAM 217 where the microprocessor 216 can use firmware instructions to convert logical block addresses to physical block addresses within the various zones where customer data is held.

It is to be noted that the various look-up tables may be stored either on the boot track or tracks of the disk or in some other non-volatile semiconductor memory in the data recording disk file, such as EEPROM, FRAM, or PROM.

Since the look up tables located in reserve zone are critical to the operation of the disk drive, zone 250 is formatted so that the chances for recovery of the data in that zone is enhanced. In the disk drive, data within the zones other than the reference zone 250 are written at a rate that will yield an error rate which will be recoverable by error correction schemes and circuitry to form usable data. More correctly, the data or information in the innermost track of each of the other zones of the disk drive will be written at a linear bit density which produces an acceptable error rate. Amongst the zones other than the reference zone, the linear bit density of the innermost track will be nearly the same. The linear bit density is how closely individual transitions are located along the track. In one zone, the innermost tracks linear bit density will determine the data rate for the zone. The data rate is the rate at which the data is read or written to the zone. Tracks within a particular zone are then written at the same data rate despite the tracks getting longer usually because another sector cannot be fit into the track or because of limitations of the data channel. The desire for a simple design might also be a factor in not creating a new zone. The tracks toward the outer radius, which are longer, are written at the same data rate but have a lower bit linear density. At the start of a new zone containing tracks with larger radii, the linear density is again increased to the density which produces an acceptable error rate. For alphanumeric data, an error rate of 1 error in 100,000,000 bits (also written as $10^{-8}$) is acceptable. A linear bit density can be selected to produce such an acceptable error rate.

In order to enhance the ability to recover the look up tables in zone 250, the data and critical information are written at a significantly lower linear bit density than the other zones on the disk. In this instance the data density is dropped to a density that is 80–90% of the rate associated with the linear density which produces an acceptable error rate. As is well known in the art of disk drives, there is a direct correlation between linear bit density and error rate. The error rates drop when the linear bit density drops. The result is that the critical information and data written in zone 250 at a lower linear bit density have a lower error rate which is more easily read and retrieved with less errors and possibly no errors.

Another way to enhance the readability of the information in zone 250 is to vary other parameters used to record data, such as data rate, and number of sectors per track. These are just a few of the parameters which could be varied to enhance the ability to read the data.

VIII. Varying Zone Parameters

Another performance enhancement related to formatting the disk, can be achieved using the zone table shown in FIG. 11 above as well as an additional table which will be described below. After the drive is assembled and the various zones are formatted with their original design parameters, each head and disk interface is given a performance test or studied for performance. The most common measure of performance is error rate or the number of errors divided by the total number of bits read by the particular head. Raw error rate can also be used for a performance measure. If a particular head has a high error rate when compared to the other heads in the disk drive, this indicates lower performance of that head when compared to the others. The parameters for the disk surface the head uses are changed to allow for better performance and a lower error rate. In a zone bit-recording drive or in a banded drive, each of the bands is basically set up so that the linear density along a track at the beginning of each zone is about the same. The linear density of the first track in a particular zone will usually produce the most error rates. Of course, as the tracks in the zone get longer, the linear density along the longer tracks in the zone drops slightly. In the next zone having longer tracks, the channel data rate for the next zone is increased so that the linear density along the first track of the next zone is about the same as the linear density along the first track in the previous zone.

In a typical distribution within a disk drive, a head or two may have a higher error rate when compared to similar heads. By decreasing data rate in the zones on disk surfaces which have poor performing heads, the linear density in the zones drops, the error rates drop, and the performance of the heads increase into a range of acceptability. This will save time since error correction can be done on the fly rather than in firmware and also since error recovery techniques will not have to be used in order to recover errors that might occur when using the poorly performing head.

Figure 13:
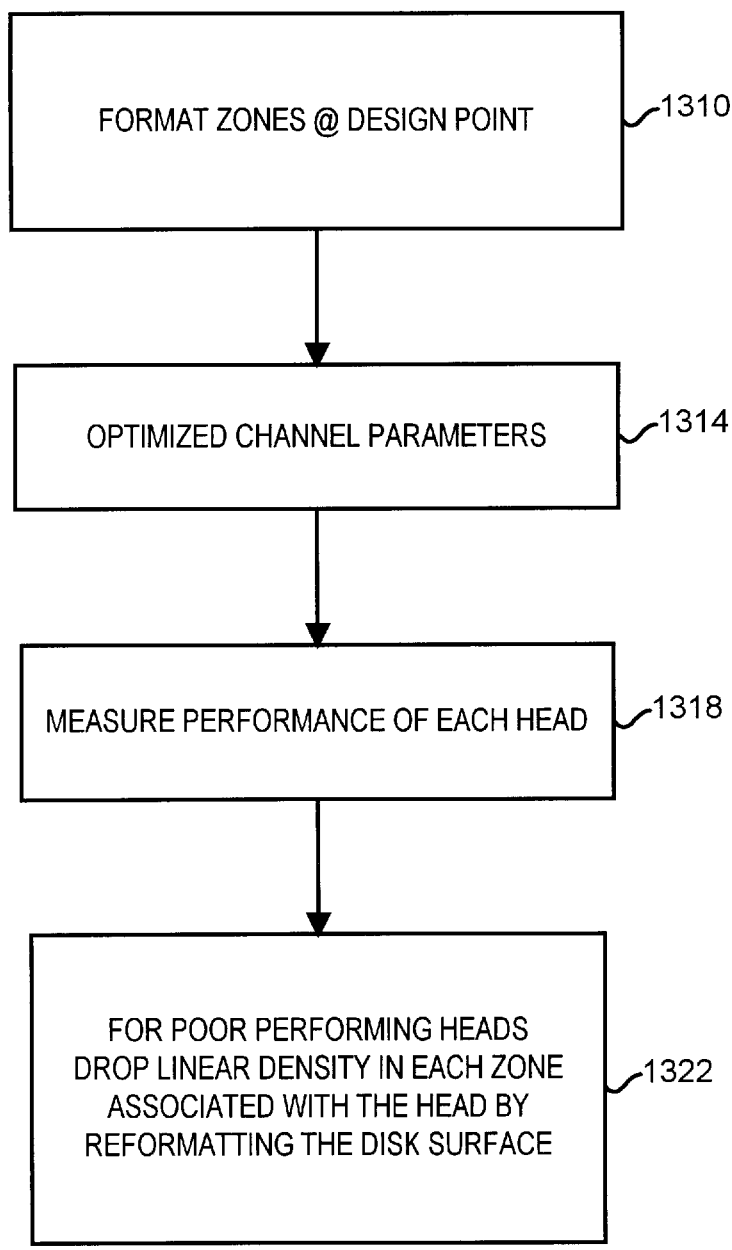
FIG. 13 is a flow diagram showing the process of optimizing the zones for given performances of transducer heads.

FIG. 13 shows a flowchart of this method for formatting a disk at the manufacture. First of all, each disk in the disk drive is formatted with an original design parameter. The design parameters can allow for an average head to perform with an adequate error rate or the design point can be somewhat aggressive such as linear densities which are approximately 8–10% over the linear densities that would allow for an acceptable error rate for an average head. The linear bit density of the innermost track of a zone will be the highest for that zone when the zone is written at a constant data rate. The original parameter to use in this method is the linear bit density of the innermost track for each of the zones. Other design parameters can also be used in this method. Formatting the zones with the original design parameters is shown as step 1310 in FIG. 13. The next step is to optimize the channel parameters which is shown as reference numeral 1314 in FIG. 13. Optimizing the data channel parameters can include shifting read windows in an analog read channel and varying the read thresholds, and varying the write current used to write the data, and varying the write precompensation. Optimizing the channel parameters also reduces the error rate produced be the particular head and disk combination.

The performance of each head and disk surface combination is then measured as depicted in step 1318. The performance measure is the error rate or the error rate per number of bits read. If the error rate is above an acceptable error rate, or below some other performance threshold for a particular head and disk combination, the linear bit density of the data and information in the zone is reduced by lowering the data rate used in the zone for the particular surface of the disk so that the error rate will be lowered to an acceptable error rate. Another way to state this is that the frequency at which the data channel must perform will be lowered. The linear density is reduced by reformatting the disk surface associated with a particular poorly performing head to drop the linear density in that zone and in all the zones on the disk surface associated with the poorly performing head. This is shown as step 1322.

Figure 14:
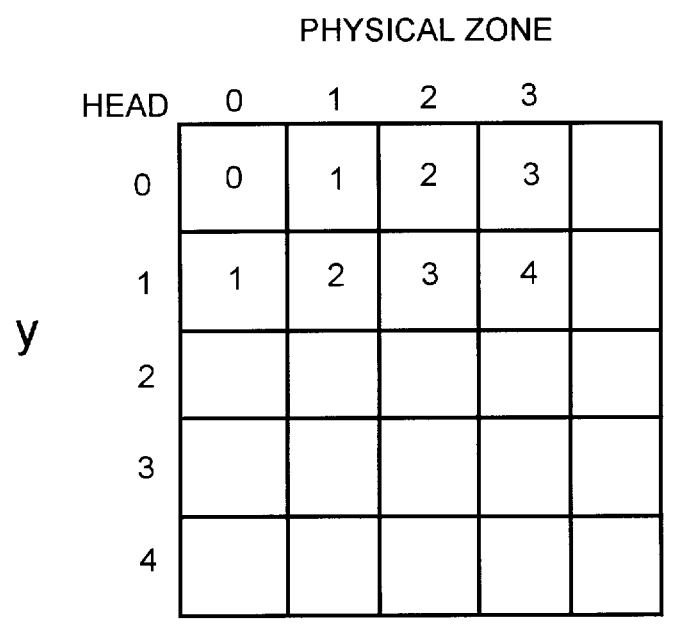

Basically, the process is to reduce the linear density or the data rate parameter to a lower linear density from an adjacent zone on the surface which a poorly performing head reads and writes to and from the the disk. This is best shown by the table shown in FIG. 14. The table shown in FIG. 14 is a map that shows the particular head in the left-hand column as it is plotted against the physical zone which are numbered 0, 1, 2 and 3 across the top. FIG. 14 is actually a plot of the design parameters versus the data rate parameters for each head in each zone. The table in FIG. 14 assumes that zone 0 is at the outer perimeter of the disk and that the zones are numbered consecutively toward the inner radius of the disk. Head 0 represents a head that performs normally and, therefore, design parameters in zone 0 are the same as the design parameters of physical zone 0. Head 1 is a poorly performing head which, when formatted with the same linear density as zone 0, had too high an error rate. The result is that the lower linear density of the adjacent zone 1 is actually found in physical zone 0 of head 1. The previously poorly performing head will have a data rate parameter that is lower than the originally designed data rate parameter for each of the zones on the surface from which it reads data and writes data. The zone formatting table shown in FIG. 14 is used to keep track of the formatting used on a particular surface so that when reading or writing is performed, the proper channel rate and data rate can be used. It should be noted that most times a shift in design parameters of one zone to a lower density associated with the adjacent zone, is generally enough of a drop in linear density to allow an acceptable performance figure in terms of error rates. However, it is contemplated that sometimes a particularly poor head may have to shift more than one zone in terms of its design parameters.

The application of the present invention to sector servo disk files has been described with reference to the disk formatted as shown in FIGS. 2 and 3. However, it should be noted that the present invention may be applied to any disk format.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of mapping logical sectors to physical sectors in a disk drive having a plurality of sparing partitions wherein each sparing partition comprises one or more tracks on one or more disk surfaces in the disk drive, each partition having a plurality of physical data sectors suitable for storing user data and being susceptible to having one or more defective physical data sectors, the method comprising the steps of:

mapping a sequence of logical data blocks to a sequence of physical sectors in the plurality of sparing partitions;

allocating a predetermined number of the physical sectors in each sparing partition as spare sectors;

scanning the disk surfaces of the disk drive to determine if defective sectors exist in the plurality of sparing partitions and if defective sectors exist;

providing a push-down defect table wherein each table row is a defect index corresponding to the order of a defect encountered in the sequence of physical data sectors and comprises an offset column entry referenced to the beginning of a partition in which the defect resides; providing a partition index table wherein each table row is a sparing partition index and comprises a first column entry corresponding to a first encountered index in the push-down defect table residing in the sparing partition index.

2. The partition index table row of claim 1 further comprising a partition push count column wherein the partition push count column in each row comprises a count of sectors from a previously ordered sparing partition which have been pushed down into a current sparing partition indexed by the partition index table row.

* * * * *